(12) United States Patent
Byren (10) Patent No.: US 7,474,332 B2
(45) Date of Patent: Jan. 6, 2009

(54) SYNTHETIC APERTURE LADAR SYSTEM AND METHOD USING REAL-TIME HOLOGRAPHY

(75) Inventor: Robert W. Byren, Manhattan Beach, CA (US)

(73) Assignee: Raytheon Company, Waltham, MA (US)

( * ) Notice: Subject to any disclaimer, the term of this patent is extended or adjusted under 35 U.S.C. 154(b) by 1066 days.

(21) Appl. No.: 10/650,212

(22) Filed: Aug. 28, 2003

(65) Prior Publication Data

US 2005/0057654 A1 Mar. 17, 2005

(51) Int. Cl.
*H04N 5/225* (2006.01)
(52) U.S. Cl. .................................................... 348/169
(58) Field of Classification Search .................. None
See application file for complete search history.

(56) References Cited

U.S. PATENT DOCUMENTS

| | | | |
|---|---|---|---|
| 5,283,672 A | 2/1994 | Hong et al. | |
| 5,510,618 A | 4/1996 | Blecha et al. | |
| 5,708,436 A | 1/1998 | Loiz et al. | |
| 5,751,243 A * | 5/1998 | Turpin | 342/179 |
| 6,525,875 B1 * | 2/2003 | Lauer | 359/371 |

OTHER PUBLICATIONS

"Short-range Synthetic Aperture Imaging at 633nm by Digital Holography." published by R. Binet, J. Colineau, and J. Lehureau, in Applied Optics, vol. 41, No. 23, Aug. 10, 2002.

"Digital Off-axis Holography with a Synthetic Aperture," published by J. Massig in Optics Letters, vol. 27, No. 24, Dec. 15, 2002.

(Continued)

*Primary Examiner*—Nhon T Diep
(74) *Attorney, Agent, or Firm*—Leonard A. Alkov (57) ABSTRACT

This invention uses a real-time holographic medium to record the amplitude and phase information collected from a moving platform at the aperture plane of a side-looking optical sensor over the collection time. A back-scan mirror is used to compensate platform motion during the synthetic aperture integration time. Phase errors caused by a nonlinear platform motion are compensated by controlling the phase offset between the illumination beam and the reference beam used to write the hologram based on inertial measurements of the flight path and the sensor line-of-sight pointing angles. In the illustrative embodiment, a synthetic aperture ladar (SAL) imaging system is mounted on a mobile platform. The system is adapted to receive a beam of electromagnetic energy; record the intensity and phase pattern carried by the beam; and store the pattern to compensate for motion of the platform relative to an external reference. In the illustrative embodiment, the image is stored as a holographic image. The system includes a back-scan mirror, which compensates the stored holographic pattern for motion of the platform. The medium and back-scan mirror may be replaced with a digital camera and one-dimensional and two-dimensional arrays may be used. In a specific embodiment, a two-dimensional array is used with a time delay and integration (TDI) scheme, which compensates for motion of the platform in the storage of the optical signals. In an alternative embodiment, a back-scanning mirror is used to compensate for motion of the platform. Consequently, the interference pattern between a relayed image of the aperture plane and a reference beam is continuously stored. In this embodiment, the instantaneous location of the received beam on the recording medium is controlled to compensate for motion of the platform.

31 Claims, 9 Drawing Sheets

OTHER PUBLICATIONS

"Infrared Search and Track Systems" published by J. Acetta, in The infrared and Electro-Optical Systems Handbook, vol. 5, Chapter 4 p. 292. at the Environmental Research Institute of Michigan, Ann Arbor, MI, 1993.

Jurgen H. Massig: Digital Off-Axis Holography with a Synthetic Aperture: Optics Letters, vol. 27, No. 24, Dec. 15, 2002.
Pages 2179-2181, XP002343454, * p. 2179, right-hand column—p. 2180, left-hand column.

* cited by examiner

SYNTHETIC APERTURE LADAR SYSTEM AND METHOD USING REAL-TIME HOLOGRAPHY

BACKGROUND OF THE INVENTION

1. Field of the Invention

The present invention relates to systems and methods for target tracking and imaging. More specifically, the present invention relates to synthetic aperture ladar systems.

2. Description of the Related Art

The resolution of a typical conventional radar system is dependent on the antenna size. Accordingly, unless the antenna diameter is quite large, the resolution is low. Synthetic aperture radar (SAR) provides a larger effective antenna size by virtue of the movement of the aperture relative to the target and integration of the returns from the target.

However, current and future applications will require further improvements in resolution, particularly angular resolution, to achieve longer range and improved imagery. This need is addressed somewhat by synthetic aperture ladar (SAL). SAL systems are similar to radar systems with the exception that a laser pulse is transmitted as opposed to a radio wave. However, SAL systems tend to be too complex and costly for many current and future applications.

Further, current synthetic aperture ladar approaches are based largely on existing synthetic aperture radar systems operating in the millimeter wave regime. These approaches use coherent heterodyne processing to extract precise Doppler information from the target signal, which is then synthesized into a high resolution angle-angle-range image using SAR image formation algorithms. Phase errors resulting from nonlinear flight trajectories are compensated using SAR auto-focus algorithms that work quite well in the millimeter regime, but may be difficult to implement at optical wavelengths, where the required sensitivity is increased several orders of magnitude.

Accordingly, a need exists in the art for a more simple and less costly system or method for providing improved resolution in a target tracking and optical imaging application. Furthermore, there is a need for an alternative for those applications that do not require three-dimensional imagery for which high-resolution angle-angle images will suffice.

SUMMARY OF THE INVENTION

The need in the art is addressed by the system and method of the present invention. In a most general implementation, the invention provides an imaging system mounted on a mobile platform. The system is adapted to receive a beam of electromagnetic energy; record an image provided by the beam; and compensate the image for motion of the platform relative to an inertial reference.

In the illustrative embodiment, the system is a synthetic aperture ladar and the amplitude and phase pattern is stored as a holographic interference pattern or hologram. The system includes one or more mutually coherent lasers used to illuminate the target scene and provide a reference beam for a holography process, a re-imaging telescope which receives the intensity and phase information from the illuminated scene, a back-scan mirror located at the infinity-focus image plane of the re-imaging telescope which compensates the stored holographic pattern for motion of the platform, a holographic recording medium, a coherent laser used to read the hologram which may be the same as the illumination and/or reference laser, and an imaging optical system capable of focusing the holographic pattern at a focal plane where the image of the target can be viewed or sensed with a focal plane array. Consequently, a relayed image of the aperture plane is continuously stored. In this embodiment, the instantaneous location of the received beam on the recording medium is controlled to compensate for motion of the platform.

In the best mode, the holographic recording medium is re-recordable and may use a liquid crystal spatial light modulator, photorefractive crystal, or other suitable recording medium. The holographic recording medium may also use a conventional photographic film, which may be developed and read in a subsequent process.

An optical phase adjuster may be used to control the instantaneous phase of the coherent reference beam relative to the illumination beam in order to compensate phase errors in the return signal caused by nonlinear platform motion in the yaw plane of the platform and/or frequency offsets caused by the average Doppler shift in the return signal if the sensor line-of-sight is not precisely at a right angle to the average platform velocity vector.

A second axis may be included in the back-scan mirror, which is also used to compensate non-linear platform motion in the vertical direction.

Additional gimbal apparatus may be used to inertially stabilize the orientation of the SAL system in one or more angular degrees of freedom.

In an alternative embodiment, the back-scan mirror is eliminated, the medium is replaced with a video camera, and the read laser and imaging optical system is replaced with a holographic processing algorithm in a computer. One-dimensional and two-dimensional arrays may be used within the video camera. In a specific embodiment, a two-dimensional array is used with a "time delay and integration" scheme which compensates for motion of the platform relative to the target in the storage of the optical signals.

BRIEF DESCRIPTION OF THE DRAWINGS

FIG. 1b shows Doppler frequency of the target return for the SAR system of FIG. 1a.

FIG. 1c shows a matched filter characteristic typically employed in the conventional SAR imaging system.

FIG. 2a is a top view of an illustrative embodiment of a synthetic aperture ladar (SAL) system implemented in accordance with the teachings of the present invention at a first position relative to a target.

FIG. 2b is a side view of the SAL system of FIG. 2a.

FIG. 2c is a top view of the SAL system of FIG. 2a at a second position relative to a target.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The objective of a synthetic aperture ladar (SAL) is to synthetically increase the effective aperture of the laser radar in order to increase the azimuth resolution of the image. The theory of operation of a traditional synthetic aperture radar or ladar based on coherent processing of the Doppler-shifted return signal is shown schematically in FIGS. 1a-c.

Figure 1A:
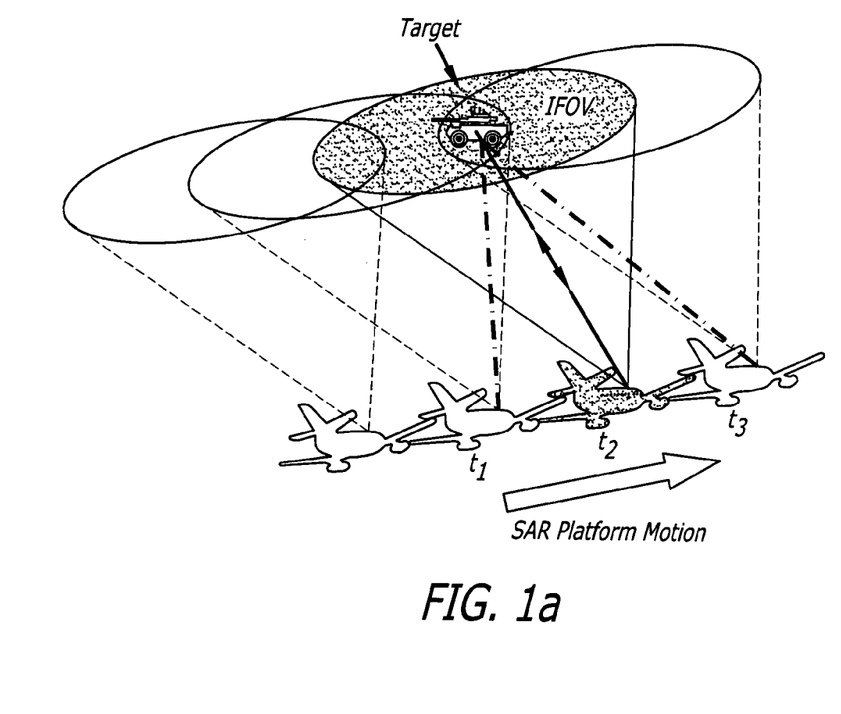
FIG. 1a is a diagram which illustrates the principle of operation (target illumination geometry) of traditional synthetic aperture ladar from a moving platform.

FIG. 1a is a diagram which illustrates the principle of operation (target illumination geometry) of traditional synthetic aperture ladar from a moving platform. The SAL system is located on a moving platform such as an aircraft and views a certain instantaneous field of view (IFOV) through a physical aperture. The platform motion translates the physical aperture in the azimuth direction as it scans past the target, displacing the IFOV over time. In the simplest embodiment, the target is a single glint return and the ladar transmitter sends out a single tone. After reflection from the target, the transmitted signal is shifted in frequency due to the relative motion between the SAR platform and the target. This effectively chirps the return signal in frequency such that information containing the precise azimuth location of the target is encoded within the frequency vs. time function, as measured by a heterodyne receiver within the SAL.

Figures 1B, 1C:
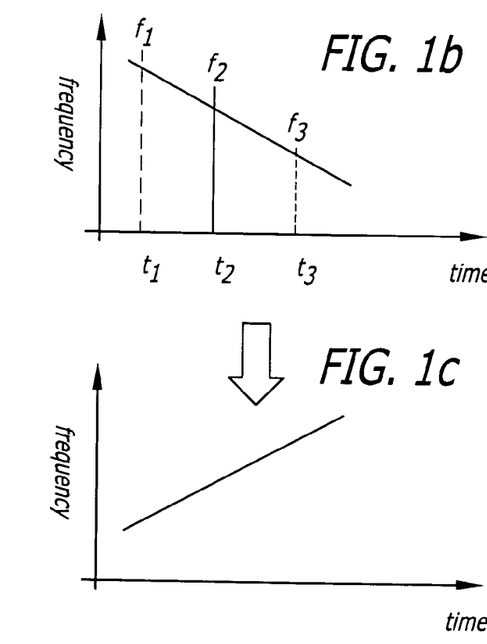
Figure 1D:
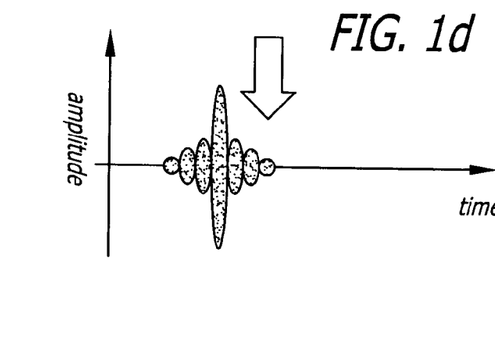
FIG. 1d shows a typical output of the matched filter of FIG. 1c.

This is illustrated in FIG. 1b which shows Doppler frequency of the target return for the SAR system of FIG. 1a. FIG. 1c shows a matched filter characteristic typically employed in the conventional SAR imaging system. FIG. 1d shows a typical output of the matched filter of FIG. 1c in response to the chirp signal of FIG. 1b. The frequency vs. time function of FIG. 1b is processed using conventional matched filtering techniques, usually performed digitally (FIG. 1c) and the resultant amplitude vs. time function provides a narrow peak corresponding to the precise azimuth location of the target (FIG. 1d). The matched filter processing is known in the art as "azimuth compression" and provides a sensor resolution that is beyond the diffraction limit of the physical aperture of the system. More complex illumination waveforms and signal processing may be used to simultaneously provide target range information for a three-dimensional synthetic image of the target.

Unfortunately, the processing required for modern pulse compression synthetic aperture ladar systems is expensive and extremely complex. For example, very wide bandwidth analog-to-digital converters are generally required to convert the spread-spectrum data from the heterodyne receiver into digital format for processing and processor intensive autofocus algorithms are used to compensate the effect of nonlinear target motion and atmospheric phase distortion. Hence, an objective of the present invention is to provide a high resolution synthetic aperture image without the cost and processing complexity inherent in traditional SAL systems.

The present invention provides an apparatus and method for creating a real-time high-resolution synthetic aperture ladar (SAL) image of a target scene from a moving platform at potentially lower cost and with less processing complexity than traditional SAL systems and techniques. It provides an improvement over prior holographic SAL approaches by implementing platform motion and phase error compensation.

Figures 2A, 2B, 2C:
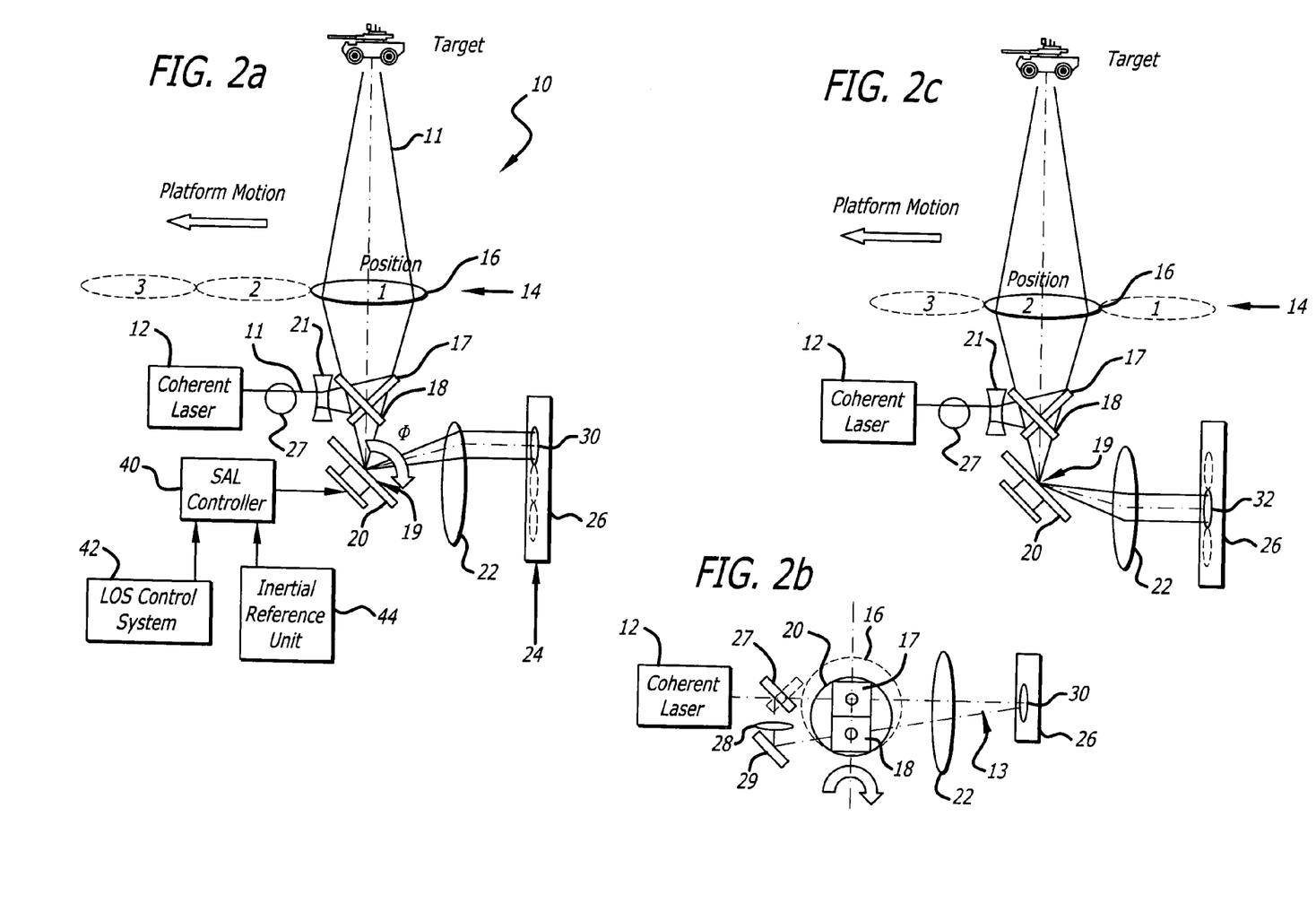

An exemplary embodiment of the present invention is shown in FIGS. 2a-c. FIG. 2a is a top view of an illustrative embodiment of a synthetic aperture ladar (SAL) system implemented in accordance with the teachings of the present invention at a first position relative to a target. FIG. 2b is a side view of the SAL system of FIG. 2a. FIG. 2c is a top view of the SAL system of FIG. 2a at a second position relative to a target which corresponds to a later time.

As illustrated in FIGS. 2a-c, a target located at some range from a platform (not shown) on which the inventive SAL system 10 is mounted is illuminated by beam from a coherent laser 12 through a physical aperture (first aperture plane) 14 that is fully shared with the receiver portion of the SAL. As in the traditional SAL approach, the coherent laser beam 11 illuminates a large instantaneous field of view (not shown) such that the target remains illuminated as the moving platform causes the SAL system to translate from right to left in the figure. The return signal is received through the shared aperture and is focused by a focusing lens 16 to a primary focus, which is located at the pivot location of a one-dimensional scan (or back-scan) mirror 20. Those skilled in the art will appreciate that the focusing lens 16 may be a single refractive element as shown, a lens group, or may include reflective or diffractive elements without departing from the scope of the present teachings. The focusing lens or group 16 may be fixed in focus or may use means known in the art to adjust the focus in order to compensate for compliance and/or thermal changes in the SAL system structure, as required by a specific application. The focus of the focusing lens or group 16 is fixed at infinity and is not adjusted for target distance. A beamsplitter 17 is disposed within the ray path of focusing lens or group 16 to deflect a portion of beam 11 from a coherent laser 12 toward the target. A negative lens or group 21 may be included in the laser beam path 11 which, in conjunction with focusing lens or group 16, results in a substantially collimated laser beam to illuminate the target. A scan mirror 20 is located such that its pivotal axis is substantially perpendicular to the average platform velocity vector and at the infinity focus plane of focusing lens or group 16. A collimating lens (or lens group) 22 is disposed after the scan mirror 20 which relays the first aperture plane 14 (which may be coincident with the focusing lens 16) to a second aperture plane 24. This second aperture plane 24 may be relayed at a different magnification than the first aperture plane 14 by tailoring the ratio of the focal lengths of the focusing and collimating lenses 16 and 22, respectively. A thin holographic recording medium 26 is disposed at the second aperture plane 24. In a preferred embodiment, the second aperture plane 24 is demagnified (i.e., smaller) with respect to the first 14 thereby reducing the size requirement of the holographic recording medium 26. The holographic recording medium 26 may be a static medium such as a photographic film or may be any persistent real-time non-linear optical recording medium such as a thin liquid crystal layer, a photo-refractive element such as crystalline barium titanate, or other means known in the art capable of writing a diffraction grating with two interfering optical beams in real time. In the best mode, the recording medium 26 is re-recordable.

Placing the infinity focus 19 of focusing lens or group 16 at the pivot point on the scan mirror 20 ensures that motion of the platform is adequately compensated at the second aperture plane 24 such that the relayed pupil is translated across the holographic recording medium as the platform motion causes the intensity and phase profile of the target return beam to translate across the first aperture plane.

In the side view of the holographic SAL apparatus of FIG. 2b, a reference beam 13 is derived from the coherent laser 12 and used to record a holographic interference pattern on the medium 26 as it interferes with the return beam. A portion of the beam from the coherent laser is split using a switchable beamsplitter 27, which may be implemented with a Fresnel reflection off a coated optical surface. This portion becomes the reference beam 13, which is directed to and focused on the scan mirror 20 at the pivot location 19 by a focusing lens 28 and fold mirrors 29 and 18. The reference beam 13 is offset from the return beam on the scan mirror in order to provide an angular offset between the reference beam 11 and the return beam at the second aperture 24 where the holographic recording medium 26 is disposed. The angular offset is chosen to provide a high fidelity interference pattern at the holographic recording medium. In this configuration, the reference beam spot is also translated across the holographic recording medium along with the second aperture pupil, providing a high fidelity interference pattern only across the instantaneous pupil location and essentially no illumination anywhere else on the holographic recording medium thereby avoiding washout of the holographic pattern. The image should be maintained stable over the recording time. Those skilled in the art will appreciate that this will require the designer to take into account the sensitivity of the medium, the speed of the vehicle and the power of the laser beam. Unless otherwise indicated herein, all components may be of conventional design and construction, the specifications for which would be chosen in accordance with the requirements of the application using conventional teachings. The laser should provide a beam of sufficient power for the application and should be coherent over the recording interval (i.e. while the platform is moving between positions 1 and 3).

When the inventive SAL system 10 is located such that the first aperture is at position 1, as shown in FIG. 2a, the holographic recording medium 26 records the phase and intensity information from the pupil region at this first aperture location through the traditional holographic process known in the art. Some time later, the platform moves such that the first aperture 14 is at position 2, as shown in FIG. 2c. At this time, the holographic recording medium 26 records the phase and intensity information at a new pupil location 32 that is displaced by a distance equivalent to the target motion as magnified or demagnified by the focusing and collimating lens systems. The new pupil location is selected by a SAL controller 40 which adjusts the rate of the scan mirror 20 through a conventional continuous drive motor, motor drive circuit and mechanical linkage (not shown). The SAL controller 40 may be implemented in hardware via analog or digital circuits or in software using a program such as that illustrated in the flow diagram of FIG. 5.

The phase and intensity information recorded in this manner is the same as it would be if the target were viewed at a single time through a larger physical aperture but with no platform motion.

Figures 3A, 3B:
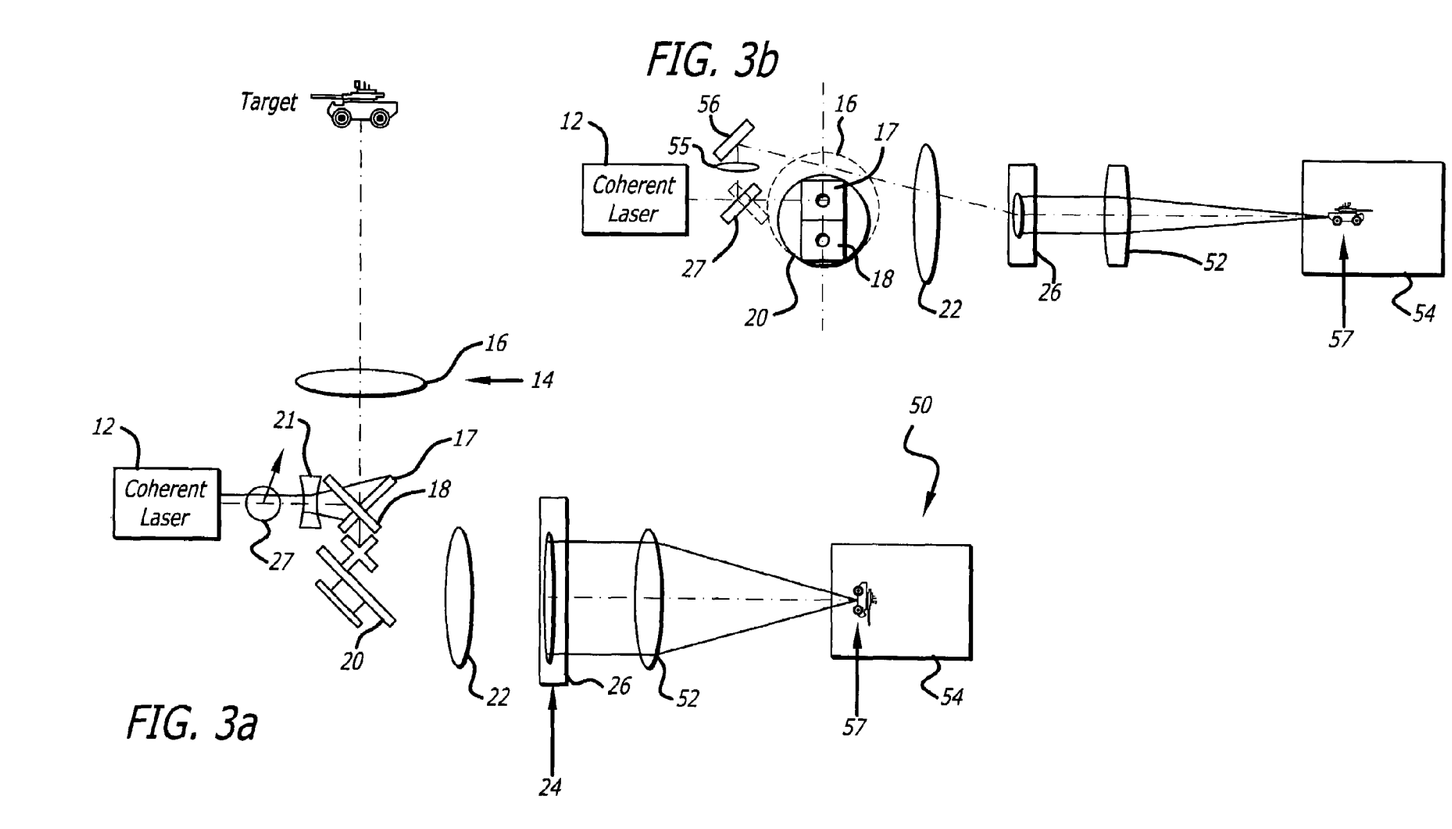
FIG. 3a is a top view of an illustrative arrangement for reading out an interference pattern stored on the holographic medium in accordance with the teachings of the present invention.
FIG. 3b is a side view of the illustrative arrangement for reading out an interference pattern stored on the holographic medium of FIG. 4a in accordance with the teachings of the present invention.

FIGS. 3a and 3b show an exemplary embodiment of the holographic readout process as applied to the present invention. FIG. 3a is a top view of an illustrative arrangement for reading out a phase and intensity pattern stored on the holographic medium in accordance with the teachings of the present invention.

FIG. 3b is a side view of the illustrative arrangement for reading out a phase and intensity pattern stored on the holographic medium of FIG. 3a in accordance with the teachings of the present invention. During readout, the beam from the coherent laser 12 is directed along a separate optical path that does not reflect off the scan mirror. The beam may be redirected by flipping beamsplitter 27 or by employing other opto-mechanical or electro-optical means known in the art to change the line of sight. This beam becomes the reference beam used to read the hologram and is focused and recollimated as needed to fully fill the entire recorded pattern on the holographic recording medium. The recording medium of this illustrative arrangement is chosen to provide a transmission hologram, however other arrangements known in the art may be used with reflective holographic media. An optical camera 50 is disposed behind the holographic recording medium and the focal plane array 54 of the camera 50 is positioned at the focal plane 57 such that it receives the image of the target via a focusing lens 52. The focusing lens is moveable in order to compensate for target range and provide a clear, sharp image of the target at the focal plane 57. This image has an azimuth resolution that is determined by the synthetic aperture size, and not by the physical aperture of the SAL system.

Figure 4:
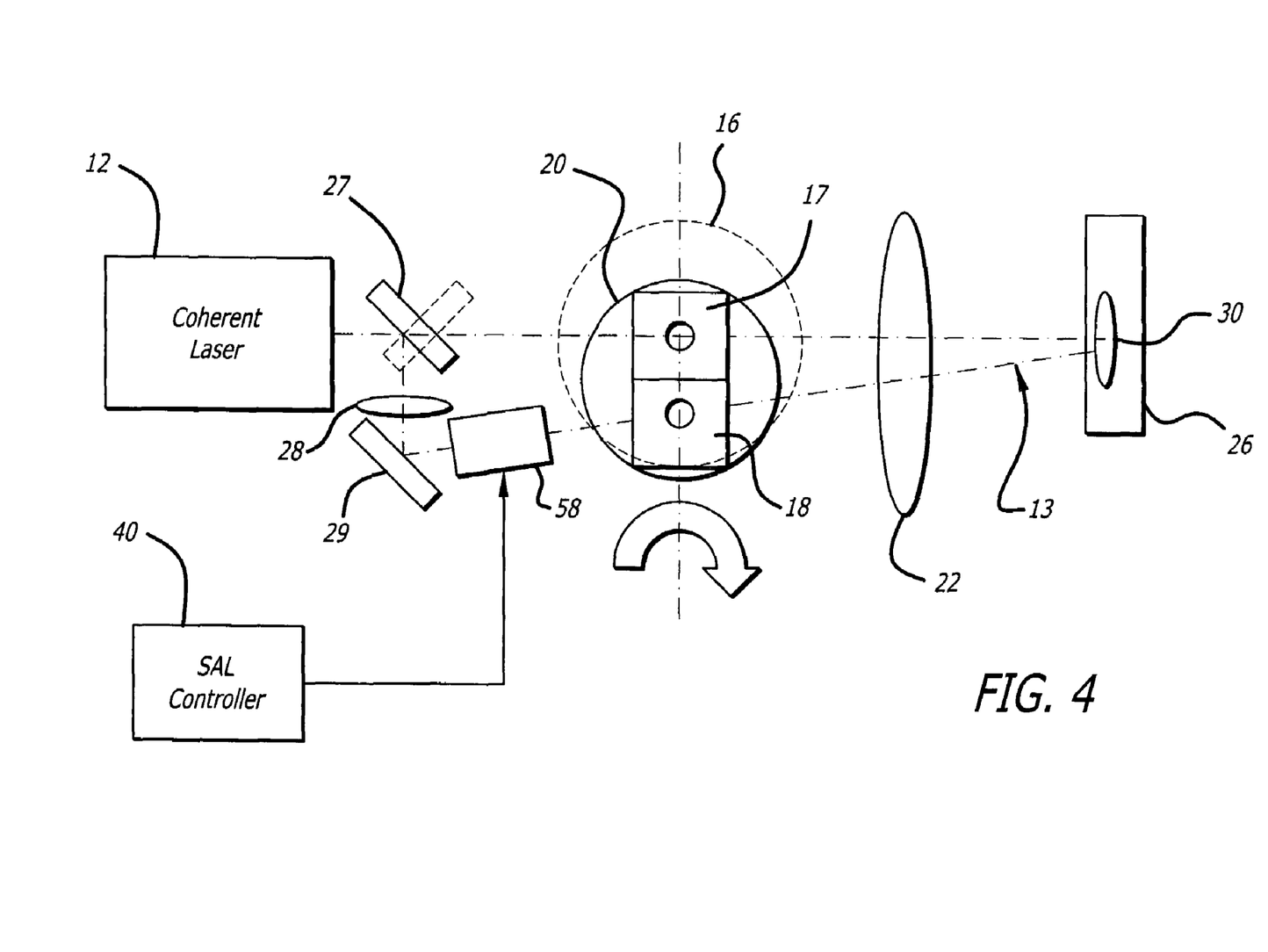
FIG. 4 shows a preferred embodiment of the present invention wherein the phase of the reference beam used to write the hologram is controlled by means of an external phase adjuster.

FIG. 4 shows a preferred embodiment of the present invention wherein the phase of the reference beam used to write the hologram is controlled by means of an external phase adjuster 58. The phase adjuster 58 may be implemented with a non-linear electro-optic crystal such as Lithium Niobate (LiNBO$_3$) or other comparable means known in the art. The phase adjuster 58 generates a phase difference between the return beam from the target and the reference beam, which interfere in the holographic medium. This phase difference is used to compensate for phase error produced by nonlinear platform motion. That is, the phase adjuster 58 changes the optical path length of the reference beam 13 while it records information on the holographic recording medium 26. This offsets the effect of changes in the optical path length of the illumination beam to and from the target and yields a stable interference pattern at the holographic recording medium 26. The phase offset command is derived by the SAL controller 40 from inertial measurements taken during the hologram formation process and gimbal angles from the line-of-sight (LOS) control system and is applied to the reference beam through the phase adjuster in real time. This process provides the same function as auto-focus in traditional synthetic aperture radar systems.

Figure 5A:
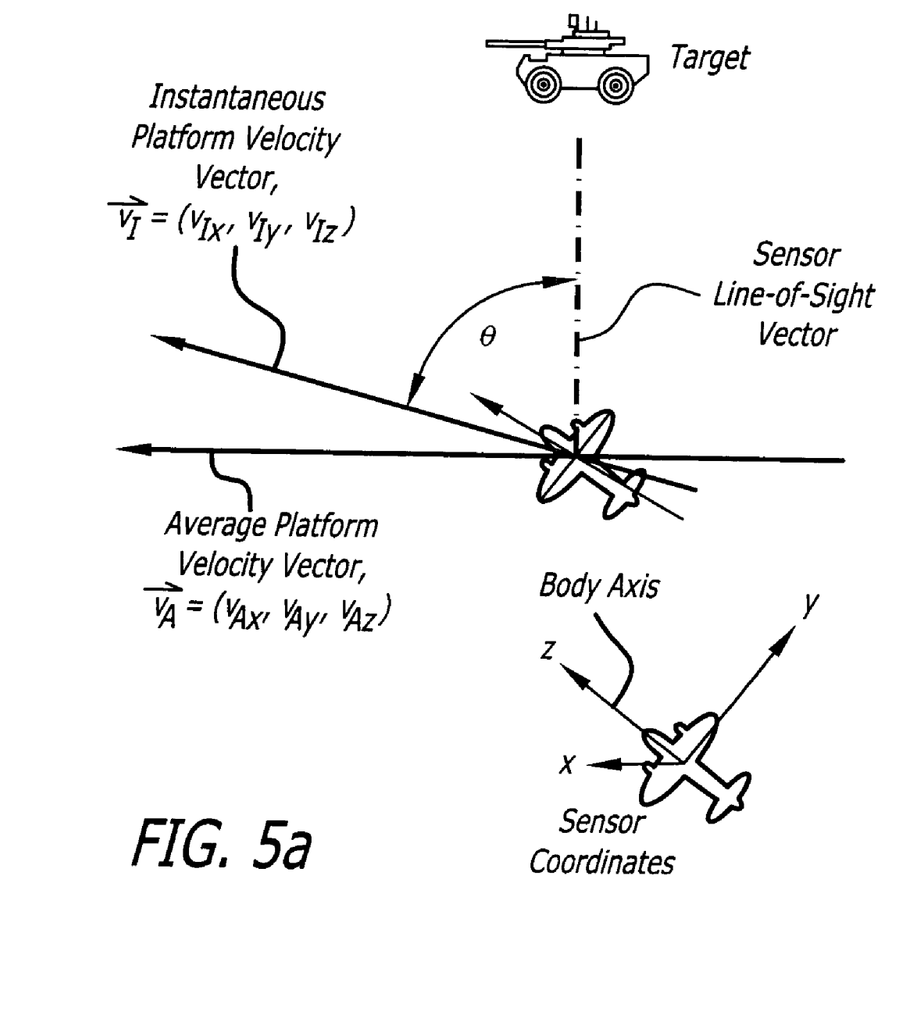
FIG. 5a shows the target and platform geometry and nomenclature as used in computing the commands to the phase adjuster, back-scan mirror, and line-of-sight control system.
Figure 5B:
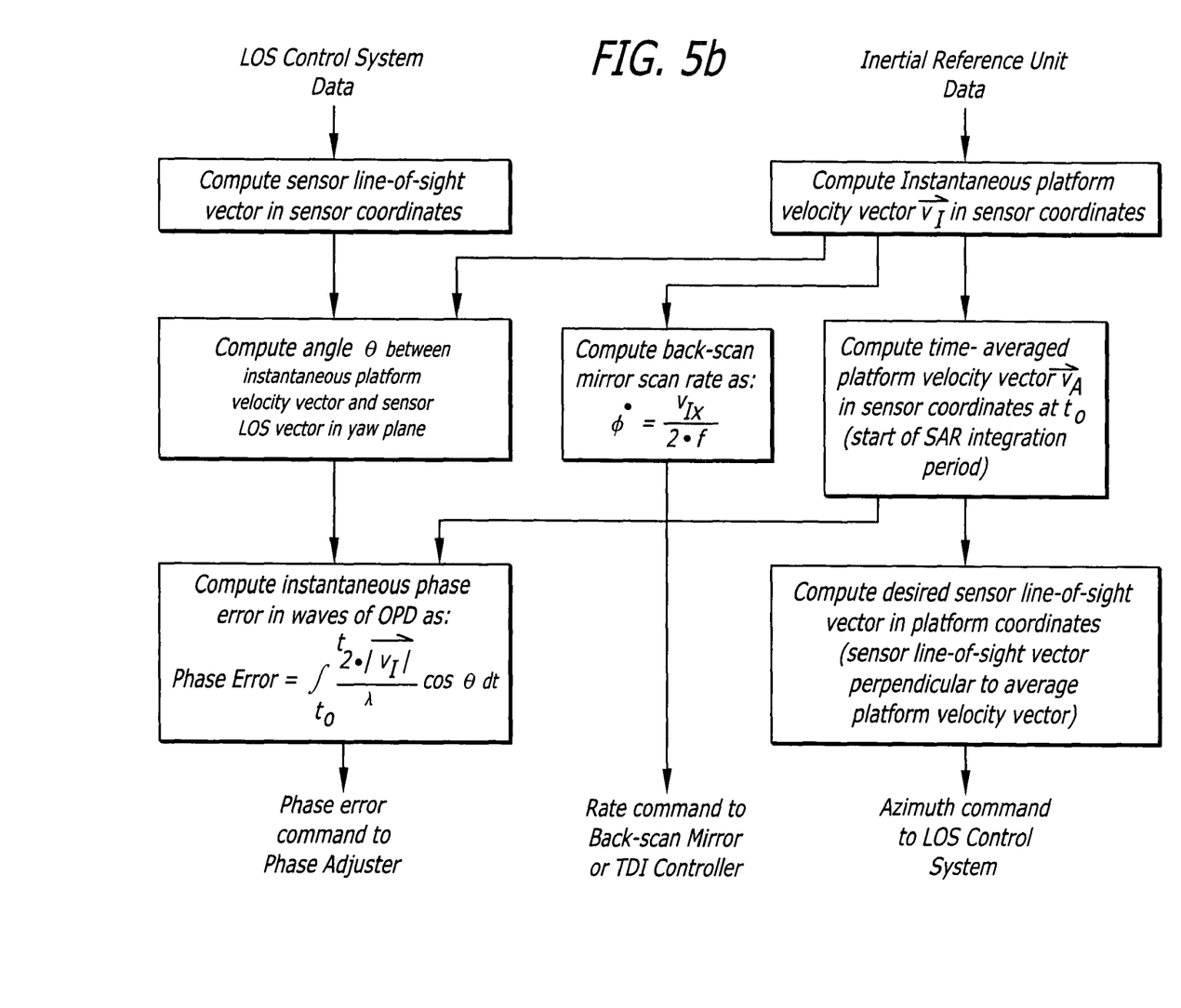
FIG. 5b is a flow diagram of software coded to run on a computer used to control the phase adjuster, back-scan mirror, and line-of-sight control system of the synthetic aperture system of the present invention.

FIG. 5a shows the geometry of the synthetic aperture ladar sensor in relationship to the target, the instantaneous platform velocity vector, and the time-averaged platform velocity vector used in the equations of FIG. 5b.

FIG. 5b is a flow diagram of software coded to run on a computer controller 40 used to control the phase adjuster 58, back-scan mirror 20, and pointing angles of the LOS control system (not shown) of the synthetic aperture ladar system 10 of the present invention. The phase error measured in waves of optical pathlength difference (OPD) used to command the phase adjuster 58 is computed in accordance with the following equation:

$$\text{Phase Error} = \int_{t_0}^{t} \frac{2 \cdot |\overrightarrow{v_1}|}{\lambda} \cos\theta \, dt$$

where:
$|v_t|$ is the absolute value or magnitude of instantaneous platform velocity vector at the time of the present measurement, t;
$\theta$ is the angle between the instantaneous platform velocity vector and the sensor line-of-sight (LOS) pointing vector;
$\lambda$ is the wavelength of the coherent laser 12; and
the integral is taken over the interval from the start of the synthetic aperture integration period, $t_0$, until the present measurement time, t.

The angular rate used to command the back-scan mirror is computed in accordance with the following equation:

$$\dot{\phi} = \frac{v_{1x}}{2 \cdot f}$$

where:
$\phi$ is the angle of the backscan mirror;
$v_{1x}$ is the vertical component of the instantaneous platform velocity vector in sensor coordinates; and
and f is the focal length of the focusing lens 16.

The azimuth angle used to command the LOS control system 42 is calculated such that the sensor LOS vector remains perpendicular to the average platform velocity vector in the horizontal plane and is inertially stabilized in the vertical plane.

Figure 6:
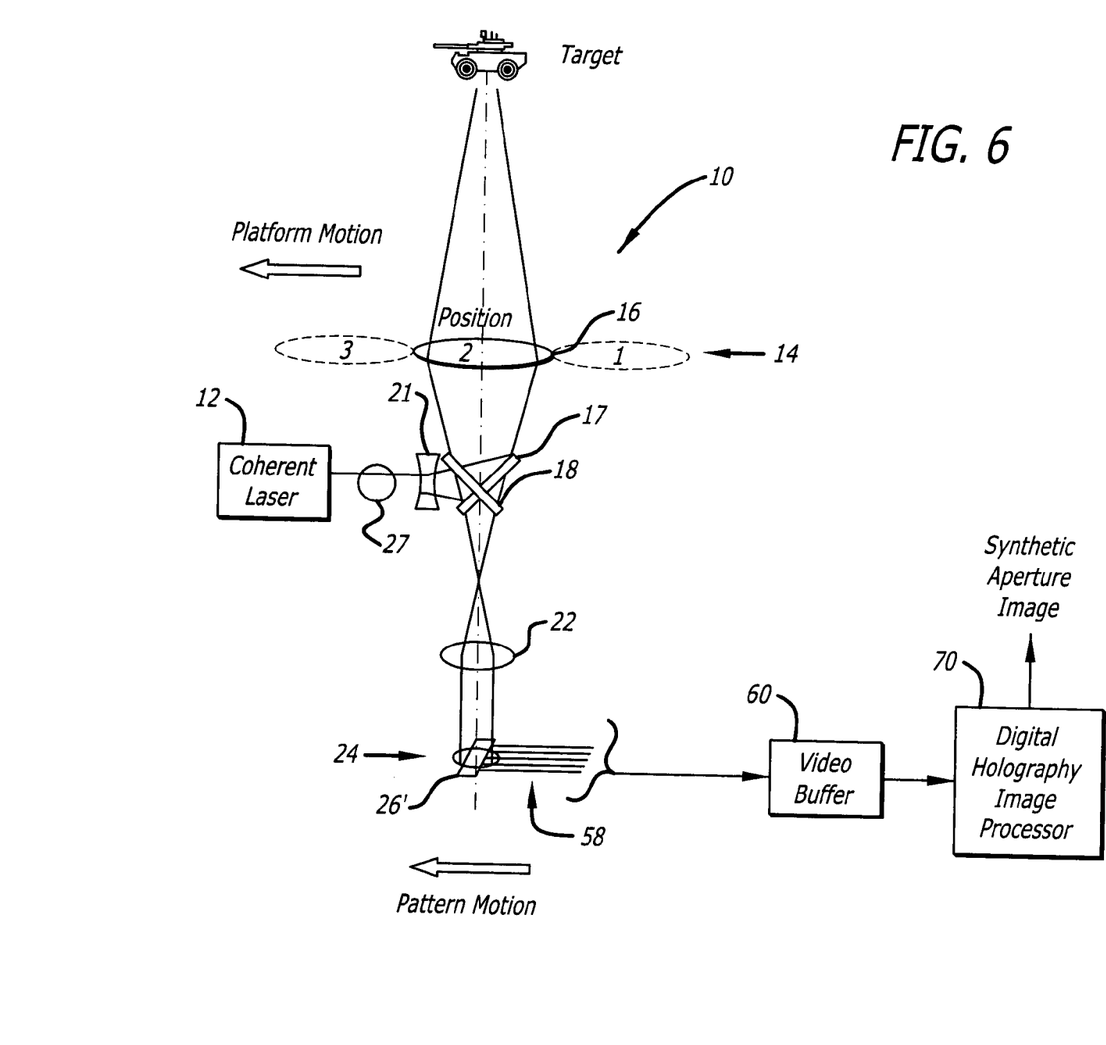
FIG. 6 shows an alternative embodiment of the SAL system of the present invention using real time digital holography.

FIG. 6 shows an alternative embodiment of the SAL system 10 of the present invention using real time digital holography. Digital holography is a process whereby holographic information is recorded using an electronic camera and the object wave is reconstructed using digital electronic image processing in a computer. The following literature references describe the process of digital holography: "Short-range Synthetic Aperture Imaging at 633 nm by Digital Holography," published by R. Binet, J. Colineau, and J. Lehureau, in *Applied Optics*, Vol. 41, No. 23, 10 Aug. 2002 and "Digital Off-axis Holography with a Synthetic Aperture," published by J. Massig in *Optics Letters*, Vol. 27, No. 24, Dec. 15, 2002.

The alternative embodiment of FIG. 6 uses digital holography to perform synthetic aperture imaging in real time. In this embodiment, the back-scan mirror 20 of FIG. 2 is eliminated and the holographic recording medium is replaced with a one-dimensional detector array 26'. The interference pattern at second aperture plane 24 moves across the detector from right to left as the platform moves from right to left. The image is formed through digital signal processing of the holographic interference pattern recorded by the detector array, thereby eliminating the readout apparatus and process shown in FIGS. 3a and 3b. The signals in readout channels 58 from the detector array 26' are stored in a video buffer 60 and processed by an image processor 70 to output a synthetic aperture image.

Note that a reference beam, derived from the coherent laser, is also used in the embodiment of FIG. 6 to produce the holographic fringes in a manner similar to that shown in the side view of FIG. 3b. A phase adjuster may also be used as disclosed above.

Figure 7:
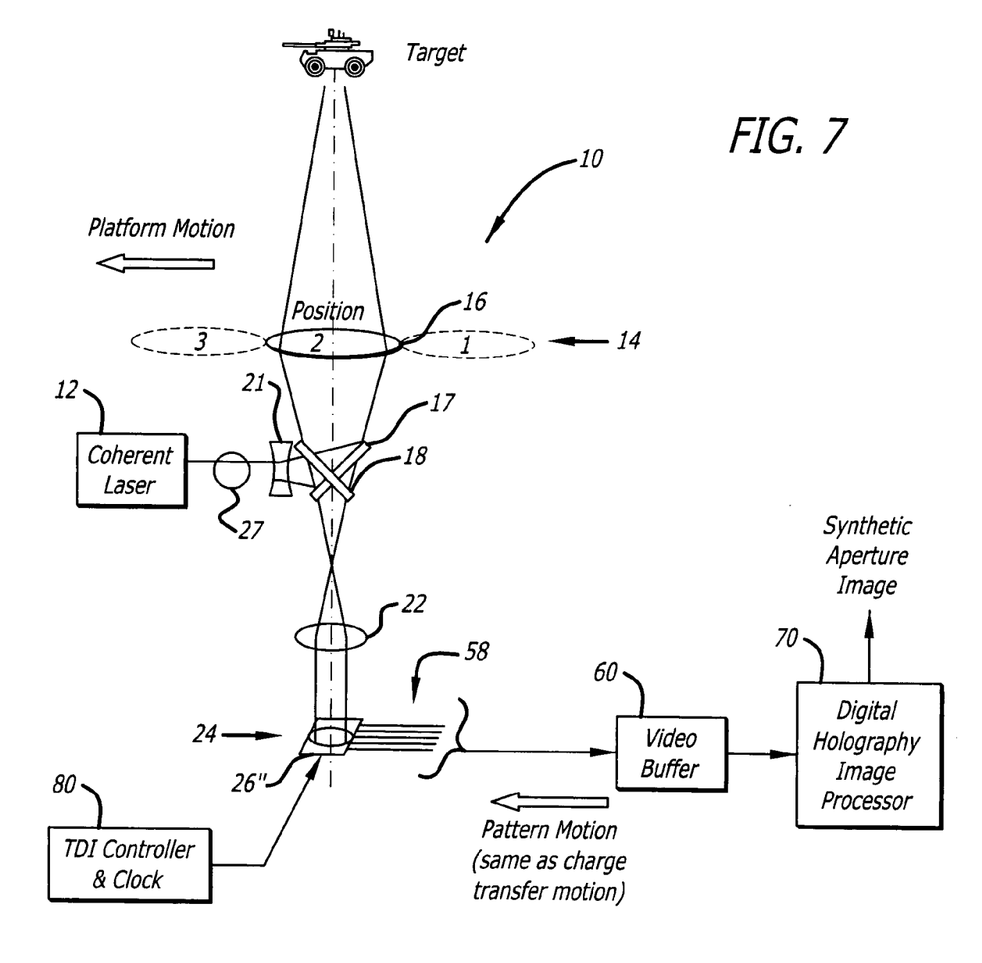
FIG. 7 shows a second alternative embodiment of the SAL system in accordance with the present teachings with real time digital holography and time delay and integration.

FIG. 7 shows a second alternative embodiment of the SAL system 10 in accordance with the present teachings with real time digital holography and time delay and integration. In this embodiment, the one-dimensional array 26' of FIG. 6 is replaced with a two-dimensional array 26" configured for Time Delay and Integration (TDI) processing.

TDI is a process whereby the sensitivity of a scanning 2-D detector array is enhanced. The process is described in several references including: U.S. Pat. No. 5,510,618, issued Apr. 23, 1996 to B. Belcha, et al. and entitled SECOND GENERATION FLIR COMMON MODULES, the teachings of which are hereby incorporated herein by reference and an article entitled "Infrared Search and Track Systems" published by J. Acetta, in *The Infrared and Electro-Optical Systems Handbook*, Volume 5, Chapter 4 p. 292. at the Environmental Research Institute of Michigan, Ann Arbor, Mich., 1993.

Figure 8A:
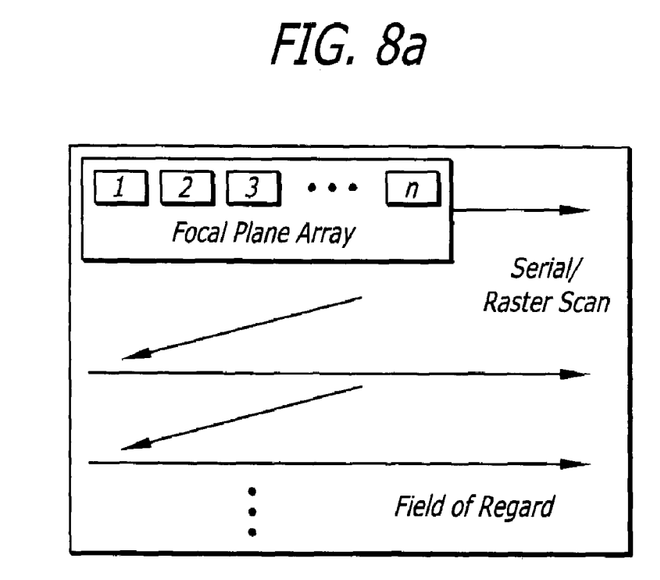
FIG. 8a is a diagram which illustrates a linear array used in a parallel scan imaging mode in accordance with conventional teachings.

FIG. 8a is a diagram which illustrates time delay and integration processing in a serial scan mode in accordance with conventional teachings.

Figure 8B:
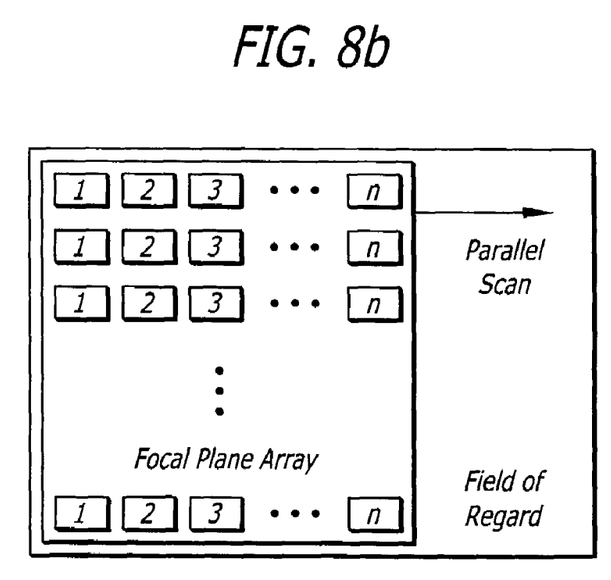
FIG. 8b is a diagram which illustrates time delay and integration processing with a two-dimensional array used in a parallel scan mode in accordance with conventional teachings.

FIG. 8b is a diagram which illustrates time delay and integration processing in a parallel scan mode in accordance with conventional teachings.

Acetta describes TDI in the context of a scanning infrared search and track system (IRST) where n detectors are scanned serially across the scene as depicted in FIG. 8a. The output signal of each detector is summed with the delayed output signals of the preceeding detectors such that each resolution element is in effect sensed by n detectors whose outputs are integrated together to yield a net signal-to-noise ratio increase of ·n.

TDI processing can be used with a one-dimensional focal-plane array (FPA) in a serial-scan or raster pattern, as shown in FIG. 8a, or with a two-dimensional FPA in a parallel-scan pattern, as shown in FIG. 8b.

Returning to FIG. 7, the 2-D array 26" may be a charge coupled device (CCD) driven by a conventional TDI controller and clock 80 such that the electric charge produced in a given detector element by the incident electro-optical radiation at each aperture location is transferred to the adjacent detector element at the same rate that the holographic pattern translates across the CCD array due to platform motion. In this way, the signal from each aperture location is integrated during successive transfer steps, producing a video output with a signal-to-noise ratio that is enhanced by a factor of ·n, where n is the number of detector elements in the direction of pattern motion. The shift rate used to command the TDI controller and clock 80 is calculated in a similar way to the back-scan mirror rate command as shown in FIG. 5b, but with a multiplicative scale factor applied to account for the focal length of collimating lens 22 and the center-to-center spacing (or pitch) of the detector elements. Those skilled in the art will appreciate that the digital holography camera must have sufficient resolution to capture the fringe pattern created by the interference between the return beam and the reference beam.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. An imaging system comprising:
    first means mounted on a mobile platform for receiving reflected beams of electromagnetic energy;
    second means for combining the reflected beams with reference beams to form a plurality of interference patterns; and
    third means for adjusting the location of individual interference patterns of the plurality of interference patterns on a recording medium to compensate the interference patterns for motion of the mobile platform and for recording the plurality of motion compensated interference patterns.

2. The invention of claim 1 wherein said third means includes means for digitally storing holographic images.

3. The invention of claim 2 wherein said holographic images are the interference patterns.

4. The invention of claim 1 wherein said third means includes a camera.

5. The invention of claim 1 wherein said third means includes a one-dimensional detector array.

6. The invention of claim 1 wherein said third means includes a two-dimensional detector array.

7. The invention of claim 1 further including means for reading said interference patterns.

8. The invention of claim 7 wherein said means for reading said interference patterns includes means for performing a time delay integration.

9. The invention of claim 1 further including means for transmitting beams from said platform to said target.

10. The imaging system of claim 1 wherein the third means includes a moveable scan mirror.

11. The imaging system of claim 1 wherein the third means includes a computer.

12. An imaging system comprising:
    structure mounted on a moving platform for receiving reflected beams of electromagnetic energy at a physical aperture of said imaging system;
    structure for recording intensity and phase interference patterns formed by the reflected beams and by reference beams; and
    means mounted on the moving said platform for relocating interference patterns relative to the recording structure to compensate for movement of the moving platform.

13. The invention of claim 12 wherein said intensity and phase interference patterns are holographic interference patterns.

14. The invention of claim 13 further including means for reading said holographic interference patterns.

15. The invention of claim 13 further including structure for transmitting beams from said platform to a target.

16. The invention of claim 15 wherein the transmitting structure includes a laser.

17. The invention of claim 15 wherein said received beams are reflections from the target of said transmitted beams.

18. The invention of claim 17 further including structure for providing reference beams.

19. The invention of claim 18 further including means for causing said reference beams and said received beams to interfere at an optically relayed aperture plane and thereby provide said holographic interference patterns.

20. The invention of claim 19 further including means for controlling the phase of said reference beams relative to said received beams.

21. The invention of claim 20 further including means for controlling the phase of said reference beams relative to said received beams to compensate for nonlinear motion of said platform during a predetermined time interval.

22. The invention of claim 12 wherein the receiving structure includes a focusing lens.

23. The invention of claim 12 wherein the recording structure includes a recording medium.

24. The invention of claim 23 wherein said recording medium is a holographic recording medium.

25. The invention of claim 24 wherein said holographic recording medium is re-recordable.

26. The invention of claim 12 wherein the relocating means includes a scan mirror.

27. The invention of claim 26 wherein the relocating means includes means for controlling said scan mirror.

28. The invention of claim 27 wherein said means for controlling includes a controller and the relocating means includes means for providing platform velocity information to said controller.

29. The invention of claim 28 wherein said means for controlling further includes means for providing sensor line of sight information.

30. A holographic synthetic aperture ladar system comprising:
    a laser mounted on a mobile platform and adapted to output a beam of coherent energy;
    an optical arrangement mounted on said platform for directing said beam to a target and for receiving a reflection therefrom;
    means for combining the reflection and a reference to form an interference pattern;
    a scan mirror in optical alignment with said optical arrangement;
    a holographic optical storage medium; and
    a controller for directing said scan mirror to adjust a position of said interference pattern on said medium in response to motion of said platform relative to said target.

31. An imaging method comprising the steps of:
    receiving a reflected beam of electromagnetic energy on a moving platform;
    combining the received reflected beam with an offset reference beam to form an interference pattern;
    recording the interference pattern; and
    relocating said recorded interference pattern on a recording medium to compensate for motion of said platform relative to an external reference.

* * * * *